Jan. 15, 1963     E. T. YOUNG     3,073,484
PRESELECTING MECHANISM FOR FLUID DISPENSING APPARATUS
Filed June 20, 1960     6 Sheets-Sheet 1

INVENTOR.
EINAR T. YOUNG
BY
Robert D. Spindle
ATTORNEY

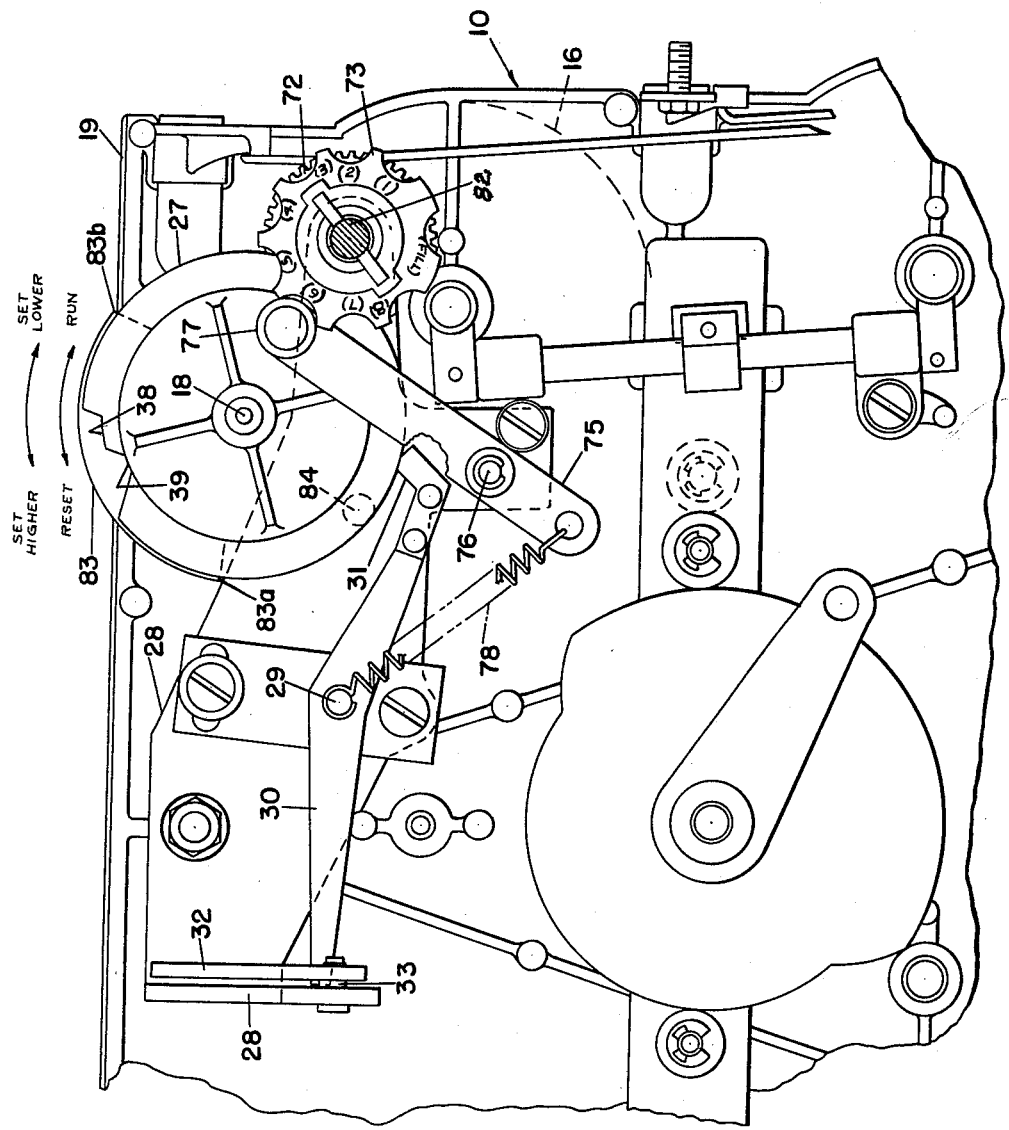

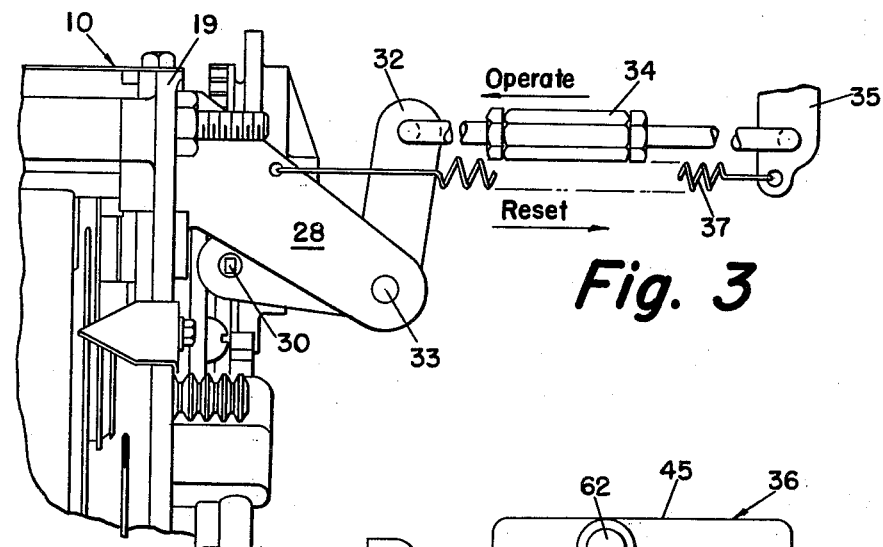
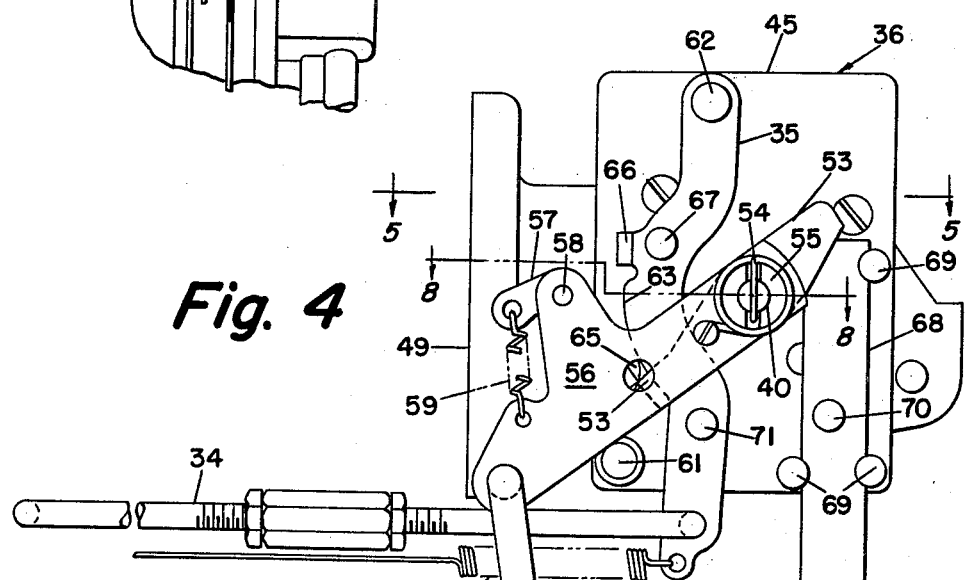
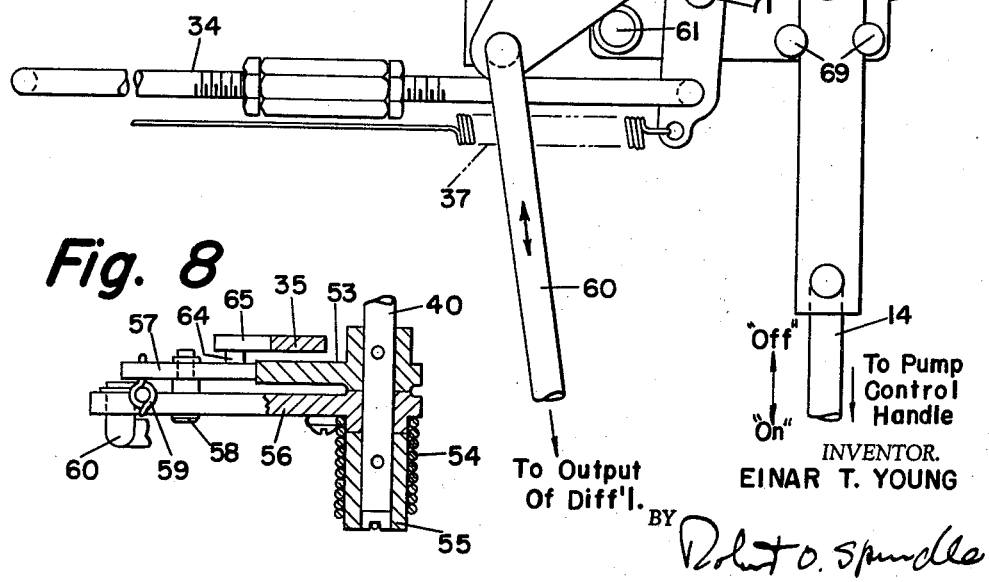

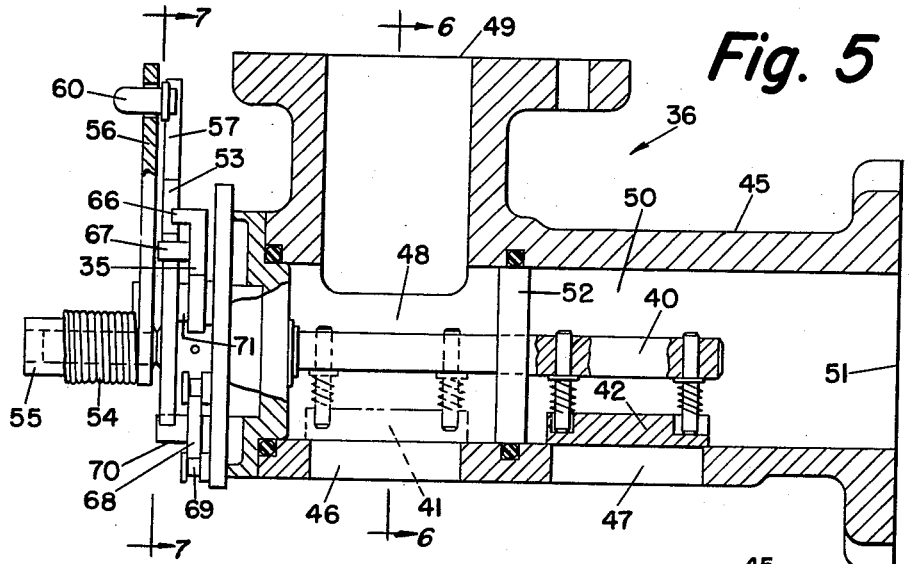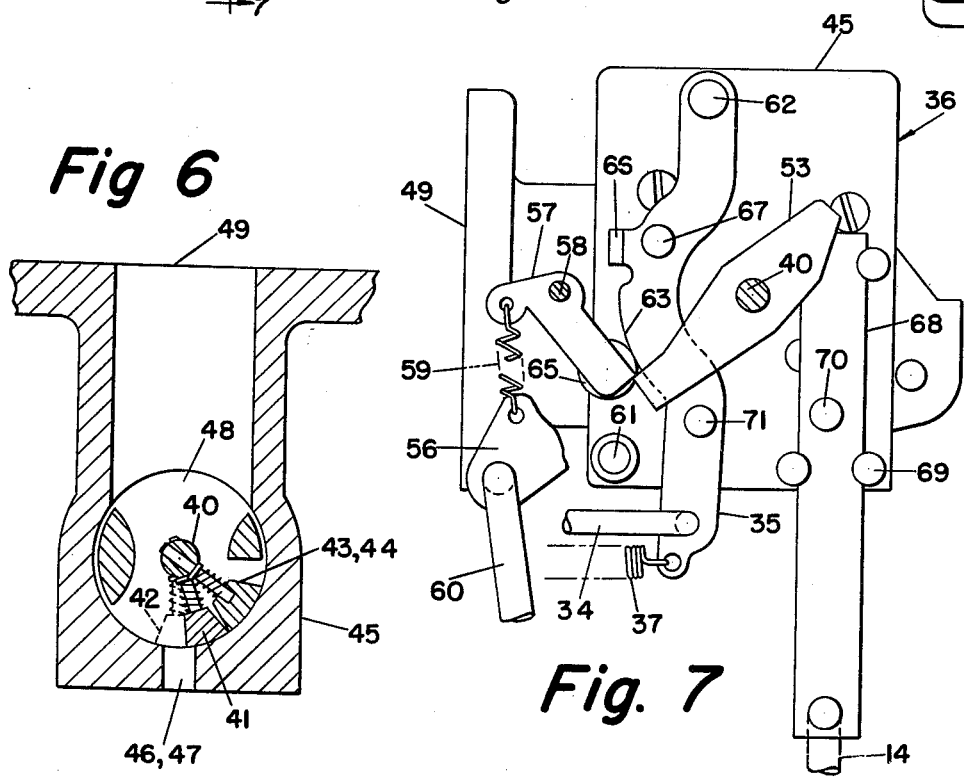

INVENTOR.
EINAR T. YOUNG
BY Robert O. Spindle
ATTORNEY

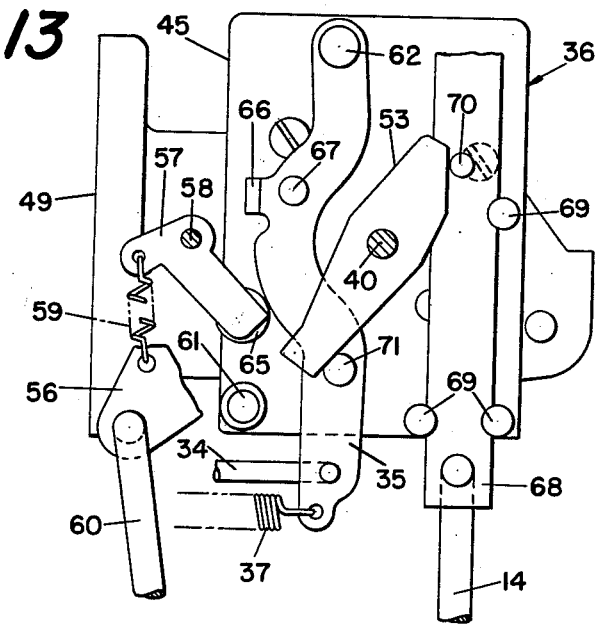

United States Patent Office 3,073,484
Patented Jan. 15, 1963

3,073,484
PRESELECTING MECHANISM FOR FLUID
DISPENSING APPARATUS
Einar T. Young, Newtown Square, Pa., assignor to Sun Oil Company, Philadelphia, Pa., a corporation of New Jersey
Filed June 20, 1960, Ser. No. 37,119
6 Claims. (Cl. 222—20)

This invention relates to a preselecting mechanism, and more particularly to a preselecting mechanism applicable to fluid dispensing apparatus, for causing a preselected or preset quantity of fluid to be dispensed, in an automatic manner. In other words, the mechanism of this invention, once the same has been put into operation, automatically stops the dispensing of fluid from the apparatus after the desired (preset) quantity of fluid has been dispensed. The preselecting mechanism of this invention is particularly useful for so-called "pumps" of the dispensing type, as commonly used in automobile service stations for dispensing motor fuel (gasoline).

The present invention constitutes an improvement over my prior copending application, Serial No. 757,578, filed August 27, 1958, which ripened on October 31, 1961, into Patent No. 3,006,504. In such prior application, there was disclosed a presettable control mechanism, for gasoline dispensing "pumps," arranged to automatically stop the dispensing of gasoline after a preset quantity thereof had been dispensed. This preset quantity, according to the said prior disclosure, was selectively measured in either volume (gallons) or cost (dollars). The requirement, in the said prior application, for preselection of either volume or cost necessitated the use of a fairly complicated mechanical arrangement.

Actual experience with "pumps" equipped with the dispensing arrangement of the prior application has shown a very small percentage of purchases by volume (i.e., a whole number of gallons), so in the present invention in gallon cut-off (or dispenisng stop) is eliminated, thus allowing a considerable simplification as compared to the prior disclosure.

In said prior application, the preselecting mechanism was disclosed as applied to a standard gasoline "pump," dispensing only a single grade of gasoline from a single reservoir; that application disclosed a separate shut-off valve operated by the preselecting mechanism. However, gasoline "pumps" for dispensing selected blends of two fluids (such as disclosed, for example, in my Patent No. 2,880,908, dated April 7, 1959) have come into fairly wide use; these "pumps" include two separate proportioning valves, operated together but in respective opposite directions, for controlling the flow of the two fluids so as to produce the proper blend. According to the present invention, such blending "pumps" are easily converted to a preselection type of operation by utilizing therefor two combined proportioning and shutoff valves, instead of the separate (extra) shut-off valve required in the aforementioned application.

According to the present invention, an improvement in the accuracy of the fluid cut-off (as compared to that of the aforesaid prior application) has been effected. This reults in a very accurate fluid shut-off at the set point, regardless of the delivery rate established by the operator of the nozzle, and is brought about by utilizing a two-step shut-off for the flow, as will be described in detail hereinafter. Therefore, among the objects of the present invention are the following: to provide a new and improved preselecting mechanism for gasoline "pumps," to provide a simplified preselecting mechanism which can be added to existing blending "pumps" with a minimum of labor and material cost, and to provide a preselecting mechanism which will give an improved accuracy of fluid cut-off.

The objects of this invention are accomplished, briefly, in the following manner. The dollar wheel of a counter or register of conventional type (which is responsive to the flow of fluid being dispensed) drives a rotatable actuating member which has two notches cut into its periphery, to thereby provide a two-step camming surface. An actuated member or arm (cam follower) is arranged to be operated by this rotatable member, the arm being adapted (by means of a mechanical linkage) to actuate the common shaft of a pair of proportioning valves each of which additionally contains, in its respective proportioning chamber, a shut-off shoe. The arrangement is such that when the arm falls into the first or shallower notch (step) on the rotatable actuating member, the shut-off shoes are moved to partially shut off the fluid delivery, and when the arm falls into the second or deeper notch (step) on the rotating actuating member, the shut-off shoes are moved to completely shut off the fluid delivery. A single "preselector" control handle is used to cause rotation of the rotatable actuating member, at a time prior to the start of dispensing, to an angular setting corresponding to a desired or predetermined cost of fluid to be dispensed. In a "fill" position of said control handle, the arm is held in an inoperative position with respect to the actuating member. In this latter position, the preselecting mechanism of the invention is in effect rendered inoperative, and the conventional automatic shut-off nozzle can take over the control of the dispensing operation. This "fill" position is also used for "manual" operation of the "pump." The "preselector" handle may be freely operated, while the dispensing "pump" is running, to change the angular setting of the rotatable actuating member to a position corresponding to a higher cost of fluid to be dispensed, if this changed setting is desired.

By means of a suitable mechanical linkage operated from the pump control handle, the combined shut-off and proportioning valves are reset when this handle is turned to the "off" position; at this same time, the arm is moved to its inoperative position (with respect to its actuating member). This allows free resetting of the actuating member along with the resetting of the counter wheels to zero. Resetting of the actuating member to its original position (i.e., to the position it had prior to the start of dispensing) is effected simultaneously with the resetting of the counter wheels to zero, and through the same gearing which effects driving of the actuating member from the counter during the dispensing operation.

A detailed description of the invention follows, taken in conjunction with the accompanying drawings, wherein:

FIG. 2 is a fragmentary side view of the preselecting mechanism;

FIG. 3 is a fragmentary front elevation of the preselecting mechanism;

FIG. 4 is a front elevation of the valve control mechanism portion of the invention;

FIG. 5 is a cross-section taken along the line 5—5 in FIG. 4;

FIG. 6 is a transverse cross-section taken along the line 6—6 in FIG. 5;

FIG. 7 is a cross-section taken along the line 7—7 in FIG. 5;

FIG. 8 is a sectional view taken along the line 8—8 in FIG. 4;

FIG. 13 is a view generally similar to FIG. 7, but showing the elements of the valve control mechanism in the "reset" position; and FIG. 14 is a side view generally similar to FIG. 2, but showing the preselecting mechanism in the "fill" position.

By way of example, the preselecting mechanism of this invention may be employed in conjunction with the register or counter described in Bliss Patent No. 2,814,444, issued November 26, 1957, and it will be so described, although it is pointed out that the preselecting mechanism to be described herein is readily adaptable to other types of counters or registers. For convenience, the counter described in said Bliss patent may sometimes be hereinafter referred to as the Bliss counter.

Ordinarily, a gasoline dispensing "pump" comprises a generally box-like housing which may contain, among other things, a register of the type referred to, with which register or counter is associated the preselecting mechanism of this invention. If the dispensing "pump" is of the blending type, there are provided, within the housing, two pumps, for respectively pumping "base" and "additive" fluids from separate reservoirs or storage tanks through separate pipes and out through separate conduits (within a single hose) to a nozzle, where the two fluids are mixed or "blended." Separate "base" and "additive" valves, which are termed proportioning valves, are provided in the respective conduits; these valves are also within the housing, and will be described in more detail hereinafter. In addition, within the housing there are various other items, such as a variator, differentials, gear boxes, meters, etc.; the arrangement of all of the "pump" items so far described (with the exception, of course, of the preselecting mechanism of this invention) may be as disclosed in my 1908 patent previously referred to.

Various control handles, most of which will be further referred to hereinafter, are provided externally of the "pump" housing, for controlling or operating the items within the housing. A "preselector" control handle enables the adjustment of the preselecting mechanism of this invention to a position such that a selected number of dollars' worth of gasoline will be dispensed, or to a "fill" position wherein the shut-off provided by the preselecting mechanism is rendered ineffective. A pump control handle enables the two fluid pumps to be turned on or off at will; this handle is also utilized to perform certain resetting functions in connection with the preselecting mechanism of the invention, as will be explained below. A "blend selector" handle selects gear ratios in a blend selection mechanism so that a desired blend of "base" and "additive" fluids will appear at the dispensing nozzle; a typical blend selection mechanism is described in detail in my copending application, Serial No. 548,907, filed November 25, 1955, now Patent No. 2,977,970, dated April 4, 1961. Finally, a conventional "reset" handle is provided, for causing a resetting of the counter wheels to zero; this operation also resets the preselecting mechanism of the invention, as will be later explained. The resetting of the counter itself is described in the aforementioned Bliss patent.

Figures 1, 1A:
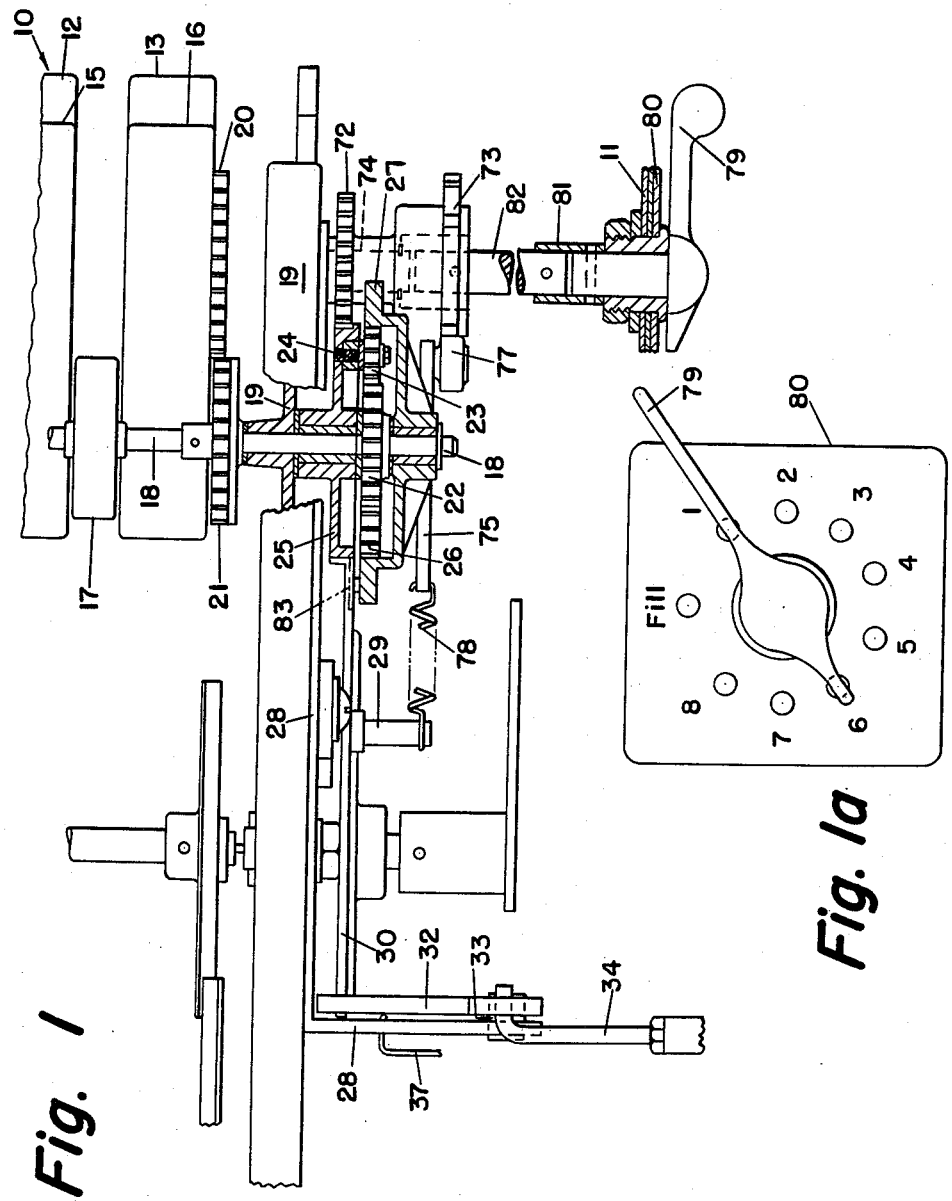
FIG. 1 is a fragmentary plan or top view of the preselecting mechanism of this invention, certain parts thereof being broken away.
FIGURE 1a is a face view of the preselector control handle and its associated dial.

Referring now to the drawings, and more particularly to FIGURES 1-3, the register or counter, denoted generally by the numeral 10, has a set of three volume (gallon) wheels two of which are shown at 12 and 13, and a set of three cost or money wheels two of which are shown at 15 and 16. The gallons wheels are driven from the output of a summing-type differential, one input to which is provided by a "base" meter (which meters the "base" fluid dispensed) and the other input to which is provided by an "additive" meter (which meters the "additive" fluid dispensed). The output of the differential thus represents the sum of the quantities of fluid passing through the two meters, which is the total gallons dispensed. The driving arrangement for the gallons wheels is described in greater detail in my 1908 patent previously referred to and forms, per se, no part of the present invention. The gallons wheels are arranged to indicate the total gallons delivered during a dispensing operation through a suitable window arrangement in the "pump" housing, a portion of the side wall of which is indicated at 11.

For driving the cost or money wheels, a somewhat different arrangement is employed. A second output from the aforementioned differential, also corresponding to total gallons, is delivered to a variator in which is set the price per gallon ascribed to the "base"; the output of this variator then represents the total gallons of both "base" and "additive" multiplied by the price of the "base". Still another output from the differential, also corresponding to total gallons, is applied to selective gearing which effects the multiplication of the total gallons delivered by an amount corresponding to the excess of the price per gallon of a "blend" being delivered over the price per gallon ascribed to the "base". The output from the selective gearing and the output of the variator are applied as the two inputs to a second summing-type differential, the output of this second differential driving the cost or money wheels such as 15, 16. The driving arrangement for the money wheels is also described in greater detail in my 1908 patent, and forms no part of the present invention. The money wheels are arranged to exhibit the total price of the "blend" delivered during a dispensing operation through a suitable window arrangement in the "pump" housing.

During the dispensing operation, the money wheels rotate, under the inpetus of the "base" and "additive" meters, which measure the "base" and "additive" fluids, respectively. It will be understood that the gallons wheels also rotate during dispensing. Each of the number wheels of the group 15, 16 of cost wheels is provided about its periphery with indicia consisting of numerals 0 to 9 inclusive, and for each complete revolution of a number wheel of lower order, the wheel of next higher order will be rotated one-tenth revolution. The transfer mechanism for transferring the count from the wheels of lower order to the wheels of higher order includes transfer pinions similar to 17 rotatably mounted on a transverse shaft 18. Upon each rotation of the wheel of lower order, the transfer pinions are engaged by a driving gear on the wheel of lower order, which imparts a partial rotation to the transfer pinion; the latter meshes with the driven gear of the number wheel of next higher order, thus advancing the number wheel of higher order one-tenth revolution each time the transfer pinion is actuated. This transfer mechanism is described more fully in the aforementioned Bliss patent. Thus, as the lower order money wheels reach 99 cents, dollar wheel 16 starts to turn, and the latter rotates one-tenth turn, to show one dollar. This repeats for two dollars, and so on.

In order to add the preselecting mechanism of this invention to the Bliss counter, one change which must be made is to lengthen the transfer pinion shaft 18 (shaft 18 being the one which supports the transfer pinions for the money wheels), so that it extends laterally beyond one of the side plates 19 of the counter 10. Another change that is necessary is to replace the dollar wheel of the Bliss counter by another dollar wheel 16 which is similar in all respects to the replaced wheel, except that the new wheel has a spur gear 20 rigidly secured to its outer face, that is, to the face of the dollar wheel which is closer to the adjacent counter side plate 19. In this connection, it should be noted that the dollar wheel is the highest-order cost wheel, and therefore does not drive any transfer pinion.

A spur gear 21 meshes with gear 20 and is pinned to shaft 18, so that this shaft rotates when gear 20 causes gear 21 to rotate. Since the transfer pinions such as 17 are freely and rotatably mounted on shaft 18, the rotation of this shaft does not interfere in any way with the proper action of the transfer pinions. When dollar wheel 16 rotates in stepwise fashion (the steps being one-tenth turn each, as previously described), gear 20 turns gear 21 in steps, resulting in a step-rotation of shaft 18.

A sun gear 22, in the form of a gear wheel, is keyed or pinned to shaft 18, near the outer end of this shaft, gear 22 then rotating along with shaft 18. A planet gear 23 is adapted to mesh with gear 22. Gear 23 is rotatably mounted on a stud 24 which is secured to and extends laterally from a gear 25. Gear 25 is rotatably mounted on shaft 18 and is positioned immediately outside of side plate 19, between this side plate and gear 22.

Ordinarily, during the dispensing operation, gear 25 does not rotate, so that stud 24 carried thereby remains fixed in location. Gear 23 then operates merely as an idler gear, rotating about its own shaft 24. In some cases, gear 25 may be manually rotated by the operator during the dispensing operation, as will be described hereinafter; however, for the present, it will be assumed that this gear does not rotate during dispensing. Actually, gear 25 is yieldably held against rotation by means of a detenting arrangement, to be hereinafter described.

The teeth of planet gear 23 mesh also with the internal teeth of a ring gear 26 which is secured within a cam or rotatable actuating member 27. Cam 27 is rotatably mounted on shaft 18, at the extreme outer end of this shaft. When dollar wheel 16 rotates during dispensing, gear 20 drives gear 21 and thus shaft 18; shaft 18 rotates gear 22, which in turn rotates gear 23 (now acting as an idler), and finally gear 26. Therefore, at each step-rotation of wheel 16, there is a step-rotation of cam 27. The gear ratios are such that as wheel 16 rotates one-tenth of a turn, cam 27 also rotates one-tenth of a turn.

A supporting member 28, which is generally L-shaped in plan view (see FIG. 1), has one plate-like leg of the L secured to the counter side plate 19 in any suitable way, for example by means of bolts. A pin 29 is firmly secured to member 28 to project laterally outward therefrom. A rocker arm or actuated member 30, which lies approximately in the same vertical plane as gear 25 (see FIG. 1), is pivotally mounted on pin 29. The pivotal mounting point of arm (or cam follower) 30 is located about midway of its length. At one end of arm 30, a shoe 31 is fastened thereto. This shoe has a portion which extends outwardly, in a direction away from side plate 19 and member 28, a distance sufficient to come into vertical alignment with the outer or camming surface of cam 27. This portion of the shoe 31 is adapted to ride on cam 27.

The other end of arm 30 extends (with a rather snug fit) through an aperture provided in one of the free ends of a pivotally-mounted bell-crank 32 which is generally L-shaped in elevation (see FIG. 3). The center lines of the two legs of the L of bell-crank 32 lie approximately at 90° to each other. One of the legs of bell-crank 32 (to wit, the one which has an aperture therein at its outer end, for rocker arm 30) extends more or less horizontally, in a direction at right angles to side plate 19 of the counter, while the other leg of this bell-crank extends substantially vertically, upwardly from its junction with said one leg. The free end of said one leg is nearer side plate 19 than is said junction, and the aperture in said one leg is in the plane of rocker arm 30. The bell-crank 32 is pivotally mounted on a pin 33 which is rigidly secured to the outwardly (and downwardly) extending leg of the supporting member 28. The pivotal mounting point of crank 32 is located at the junction of the two legs thereof.

One end of a link member 34 is connected to the free end of the vertically-extending leg of crank 32, the point of connection of the link being near the uppermost end of the crank and the said connection being a pivotal one. The link member 34 extends more or less horizontally, in a direction substantially at right angles to counter side plate 13. The other end of link 34 is pivotally connected to the lower or free end of a pivotally-mounted camming and stop arm 35 which is one of the actuating members for a combined proportioning and shut-off valve denoted generally by numeral 36 and to be later described in detail. One end of a tension spring 37 is fastened to the free end of arm 35, while the other end of this spring is secured to the stationary support member 28. Spring 37 urges arm 35, link 34, and the upper end of bell-crank 32 to the left (in FIG. 3). This tends to rotate crank 32 in the counterclockwise direction (in this same figure) about its pivot 33, urging the coupled end of rocker arm 30 downwardly. Thus, rocker arm 30 is urged to rotate in the counterclockwise direction (in FIG. 2) about pivot 29, urging the shoe 31 upwardly toward cam 27. Therefore, spring 37 urges the aforementioned members in the direction of making shoe 31 ride on cam 27.

The camming surface of cam 27 is of uniform radius, except for a circumferential length which subtends a central angle of some forty-odd degrees. In this last-mentioned length, two notches or steps (portions of decreased radius) 38 and 39 are provided in the outer periphery of cam 27, the radius of step 38 being greater than the radius of step 39 (i.e., 39 is a deeper notch than is 38), and step 38 being located immediately clockwise (in FIG. 2) from step 39.

The step-rotation of cam 27 which takes place during dispensing and which was previously described, takes place in the "Run" or clockwise direction in FIG. 2. As previously described, shoe 31 is urged (by spring 37) to ride on cam 27. Assume that at the start of dispensing shoe 31 is in engagement with cam 27 at a location spaced angularly from notches 38 and 39 (as illustrated in FIG. 2, wherein the preselector is set to dispense six dollars' worth of gasoline). When cam 27 rotates (clockwise) far enough, shoe 31 falls into (the first) notch or step 38 of cam 27, under the urging of spring 37. This movement causes arm 35 to move far enough to actuate the shut-off valves to a partially closed position, thus slowing down the rate of dispensing (as will be further detailed hereinafter). Then, cam 27 continues to rotate, but at a slower rate, due to the slower rate of fluid flow. Finally, shoe 31 falls into the second (deeper) notch 39 of the cam, again under the urging of spring 37. When this happens, arm 35 is moved far enough to completely close the shut-off valves, thus shutting off the flow completely (as will be hereinafter explained). It may be seen that when shoe 31 falls into the cam notches, rocker arm 30 rotates counterclockwise in FIG. 2, causing bell-crank 32 to rotate counterclockwise (in FIG. 3) about its pivot 33, moving link member 34 and arm 35 to the left in FIG. 3. This is the "Operate" direction indicated in FIG. 3.

Reference will now be made to FIGS. 4-8, which illustrate the combined proportioning and shut-off valve 36 previously referred to; the shut-off features of this valve are under the control of shoe 31 on rocker arm 30, as governed in turn by cam 27. A shaft 40 serves to mount the spring-engaged valve proportioning members or shoes 41 and 42, and also the spring-engaged shut-off shoes 43 and 44. All of the shoes, 41, 42, 43, and 44 are provided with cylindrical surfaces engaging the interior wall of a bore in the valve housing or body 45. Outlet port 46 cooperates with the shoes 41 and 43 for the control of flow of the "additive" fuel constituent, while outlet port 47 cooperates with the shoes 42 and 44 for the control of flow of the "base" fuel constituent. It may be seen that by rotation of shaft 40, the various shoes 41–44 may be made to selectively cover or uncover their corresponding outlet ports. The "additive" fluid enters the chamber 48 in the valve housing 45 through the connection 49, and the "base" fluid enters the chamber 50 through the connection 51, the two chambers being separated by a partition 52. It may be seen that shoes 41 and 43 are in chamber 48, while shoes 42 and 44 are in chamber 50. The "additive" outlet port 46 is coupled through a pipe (not shown) and a sight glass (not shown) to one of the two tubes of a concentric-tube dispensing hose. The "base" outlet port 47 is coupled through a separate pipe and a separate sight glass to the other of the two tubes of the dispensing hose. The two constituents or fluids flowing respectively through the two tubes of the dispensing hose do not become admixed or "blended" until they reach a position very near to the hose nozzle.

The proportioning valve structure so far described (with the exception, of course, of the shut-off shoes) is generally rather similar to that described in my aforementioned application, Serial No. 548,907. The entire valve structure utilized in the present invention comprises a proportioning shoe 41 and a shut-off shoe 43 in chamber 48, and a proportioning shoe 42 and a shut-off shoe 44 in chamber 50; the chambers 48 and 50 are both in a common valve body or housing 45. All of the valve shoes 41–44 are operated by means of the common valve shaft 40.

It will be noted from the figures that the outlet ports 46 and 47 are substantially rectangular and are in the same radial alignment, the proportioning shoes 41 and 42 being angularly displaced relative to each other (say by an angle of 19.5°), so that there is closing of one outlet port as the other is opened by the shoes 41 and 42. In FIGURES 5 and 6, the proportioning shoes 41 and 42 are illustrated in the positions corresponding to a dispensing of only "additive" fluid. In FIGURE 6, the proportioning shoe 42 is shown in phantom, since in this figure said shoe would be behind the partition 52. In the illustrated position, "base" shoe 42 completely closes "base" outlet port 47, and "additive" shoe 41 is completely open with respect to its outlet port 46. The shut-off shoes 43 and 44 are in the same radial alignment, so are illustrated in FIGURE 6 as only a single shoe; in the position being described (during dispensing, and before shut-off) shoes 43 and 44 are angularly spaced from their respective ports 46 and 47 an amount such as to be completely ineffective for fluid control purposes. It will be understood that by rotating valve shaft 40 from the position illustrated in FIGURES 5 and 6, the proportions of the two fluids delivered to their respective dispensing conduits can be changed.

For a dispensing of only "base" fluid, "base" shoe 42 would be completely open with respect to its outlet port 47, and "additive" shoe 41 would completely close its port 46. In this latter situation, during normal dispensing and before shut-off, the shut-off shoes 43 and 44 would still be ineffective with respect to the ports 46 and 47, respectively.

For a dispensing of part "base" and part "additive," the proportioning shoes 41 and 42 would occupy some intermediate position with respect to their respective ports 46 and 47 (the particular position depending upon the relative proportions of "base" and "additive"), the ports 46 and 47 then both being partially closed (or partially open, depending on the way one looks at it). In this connection, it is again pointed out that, as shaft 40 is rotated to change the relative proportions of "base" and "additive," one proportioning shoe closes its outlet port as the other proportioning shoe opens its outlet port. In any intermediate or "blend" position of the proportioning valves, the shut-off shoes are ineffective with respect to the outlet ports, during normal dispensing and before shut-off.

The common valve operating shaft 40 extends through both chambers 50 and 48, through the partition 52, and through one end wall of the valve housing 45 to the outside of this housing. Outside of the valve housing, a shaft operating ratchet 53 is pinned to shaft 40, so as to be rigidly connected thereto. A torsion spring 54, wound under tension, surrounds a collar 55 which is pinned to the outer end of the valve shaft 40, beyond (outwardly with respect to the valve housing 45) ratchet 53. One end of spring 54 is secured to collar 55, while the other end of this spring is fastened to one of the two oppositely-disposed arms of a somewhat T-shaped lever 56. At the end of this same arm, lever 56 is rotatably mounted on shaft 40. Spring 54 urges shaft 40 (and consequently also ratchet 53, pinned thereto) to rotate clockwise (in FIGURE 7). As may be seen in FIGURE 8, lever 56 lies in a plane spaced outwardly (with respect to the valve body or housing 45) from ratchet 53. Lever 56 is thus positioned between collar 55 and ratchet 53.

A pawl 57 is rotatably mounted on a pin 58 which is secured to the T base portion of lever 56. Pawl 57 is in back of lever 56 and lies in the same plane as ratchet 53 (see FIGURE 8), in such a position that in the running or dispensing position illustrated in FIGURES 7 and 8, the end of pawl 57 can engage the left-hand end of ratchet 53 and prevent the latter from rotating clockwise, with one exception. Pawl 57, being carried by lever 56, partakes of the motion of this lever. Ratchet 53 is thus prevented from rotating clockwise by pawl 57, except as pawl 57 itself moves along with lever 56. A tension spring 59, one end of which is attached to lever 56 and the other end of which is attached to pawl 57, urges said pawl to rotate counterclockwise about its pivot 58, and thus tends to hold the end of pawl 57 in engagement with ratchet 53.

One end of a link 60 is pivotally secured to that arm of lever 56 which is opposite to the arm thereof mounted on shaft 40. Link 60 is manually adjusted to a predetermined position (only in the case of the dispensing of pure "base" or pure "additive"), prior to the start of dispensing. For the dispensing of a blend, this link is moved up or down automatically by the blending mechanism, as called for by any change in conditions. The particular arrangement for moving this link, both manually (prior to dispensing) and automatically (during dispensing) will be described only briefly herein, since per se it forms no part of the present invention and since it is described in detail in my '908 patent and in my application Serial No. 548,907, previously referred to. Speaking generally, an output from the "base" meter provides an input to an adjustable "base" gear box, while a corresponding output from the "additive" meter provides an input to an adjustable "additive" gear box. The outputs of these gear boxes drive a differential, the output of which operates (through various gears, clutches, etc.) the link 60 to control the relative positions of the "base" and "additive" proportioning shoes 41 and 42. The settings of the gear boxes just referred to determine the relative flows which would be required to maintain at zero the output of the differential to hold the proportioning shoes in fixed relative position. In other words, with particular settings of the "base" gear box and the "additive" gear box (these being set manually prior to dispensing, as described in application Serial No. 548,907), if the "base" and "additive" meters (during dispensing) indicate a proper ratio of deliveries of "base" and "additive," the output of the differential is zero and does not affect the settings of the proportioning shoes.

If the rate of flow of "additive" relative to "base" exceeds the predetermined ratio, the differential will have an output of such direction as to move the link 60 upwardly. As will be hereinafter described, this moves the "additive" shoe 41 toward closed position and the "base"

shoe 42 toward open position. The result is readjustment of the individual flows to a ratio predetermined by the gear box settings and resulting in zero output from the differential. If the "base" flow is in excess, a reverse output from the differential occurs, moving link 60 downwardly. This corrects the ratio of the flows in the opposite direction. Thus, during dispensing the composition delivered is maintained at a predetermined fixed value.

As link 60 moves up and down, lever 56 is urged to rotate back and forth about shaft 40, on which this lever is rotatably mounted. As previously described, FIGURES 5 and 6 illustrate the proportioning shoes as being in a position to dispense only "additive." In this situation, link 60 is in its lowermost position, and lever 56 is in its most counterclockwise position. In this position, the side of lever 56 engages a locating stop 61, which latter comprises an outwardly-extending pin rigidly secured to the valve body 45.

The camming and stop arm 35 (to the free end of which link 34 and spring 37 are attached, as previously described) is pivotally supported by a pin 62 secured to valve housing 45. Arm 35 is located immediately adjacent the end wall of valve body 45, behind or in back of ratchet 53 and pawl 57. Intermediate its ends, arm 35 is provided with an arcuate camming portion or cam surface 63 (the center for the arc being about at the center of shaft 40). A pin 64 is attached to the longer free end of pawl 57 (the same end of this pawl which during dispensing engages ratchet 53), and this pin rotatably mounts a roller 65 which is adapted to ride on the arcuate camming surface 63.

The spring 54 forms part of a closed system, since one end of it is attached to lever 34 and its other end engages collar 55 pinned to shaft 40. This spring expends itself by urging together ratchet 53 (attached to shaft 40), on the one hand, and lever 56 and pawl 57 (mounted on lever 34), on the other hand. Thus, during dispensing, link 60 can operate valve shaft 40 without pushing against spring 54; link 60 can in effect turn shaft 40 directly. In other words, as the up and down motion of link 60 (during dispensing) rotates lever 34 back and forth, ratchet 53, shaft 40, and all the vlavle shoes 41–44 rotate, under the control of link 60. As previously described, the proportioning shoes 41 and 42, when they rotate, vary the respective ports 46 and 47 to control the flow of the two fluids, and therefore the "blend" at the nozzle. More specifically, when the link 60 moves downwardly, the end of pawl 57 (which pawl moves downwardly with lever 34) pushes ratchet 53 and shaft 40 counterclockwise, which (assuming a "blend" is being dispensed, rather than only "additive" or only "base") closes the "base" proportioning shoe 42 and opens the "additive" proportioning shoe 41. When link 60 moves upwardly, lever 56 and pawl 57 move upwardly; the end of pawl 57 moves away from ratchet 53 and allows spring 54 (which normally urges shaft 40 in the clockwise direction) to push shaft 40 clockwise, this movement of the shaft now being rendered possible due to the release of ratchet 53 by pawl 57. This movement of shaft 40 opens the "base" shoe 42 and closes the "additive" shoe 41.

During movement of lever 56 and pawl 57 up and down under the control of link 60, the pawl roller 65 rides along camming surface 63.

If prior to dispensing, a selection of pure "base" or pure "additive" is made, link 60 is manually adjusted (by means of its associated control mechanism) to initially rotate the proportioning shoes 41 and 42 to the appropriate initial position. The same mechanical movements as those previously described then take place to properly rotate the valve shaft 40, but in this case the link 60 is adjusted manually, rather than automatically. This action is described in more detail in my copending application. Serial No. 548,907.

Arm 35 has an integral outwardly-extending lug 66 thereon, between the upper end of cam surface 63 and the pivot 62. This lug extends outwardly with respect to valve body 45 a distance sufficient to lie in the plane of ratchet 53, and at such a lateral location that it can engage or intercept the left-hand end of ratchet 53. Arm 35 also carries a stop 67, in the form of an outwardly-extending pin rigidly secured to arm 35. Stop 67 is located slightly beyond (in the direction of pivot 62) the lower or ratchet-engaging end of lug 66, and this stop 67 is located to the right of lug 66. The spatial relation of elements 66 and 67 is such that under certain conditions (to be described hereinafter) the end of ratchet 53 can engage lug 66, as a first or preliminary stop; then, upon movement of arm 35 to the left, lug 66 moves out of the way of the end of ratchet 53, and this ratchet can come into engagement with pin 67, as a final stop.

As previously described, during the step-rotation of cam 27 shoe 31 falls into the first step or notch 38, and thereafter into the second notch or step 39. The arrangement and angular location of notches 38 and 39 on cam 27 is such that shoe 31 falls into the first notch 38 at a time when the dollar wheel 16 is near to the desired preselected number of dollars, but has not yet reached this number; thereafter, shoe 31 falls into the second notch 39 at a time when dollar wheel 16 has exactly reached the preselected number of dollars.

It will be remembered that as shoe 31 falls into notch 38 under the urging of spring 37, arm 35 moves to the left. As it does so, the cam surface 63 on arm 35 cams or pushes roller 65 (which is riding on this cam surface) and pawl 57 on which said roller is mounted, to the left. Pawl 57 can rotate clockwise about pin 58, against the bias of spring 59. The end of pawl 57 (which, during dispensing, is in engagement with ratchet 53) is thus pushed out of the way of ratchet 53, allowing this ratchet to rotate clockwise (under the urging of spring 54) until it is stopped by lug 66 on arm 35. The operating elements have now reached the position illustrated in FIGURE 9. This is the condition of partial shut-off.

Figure 9:
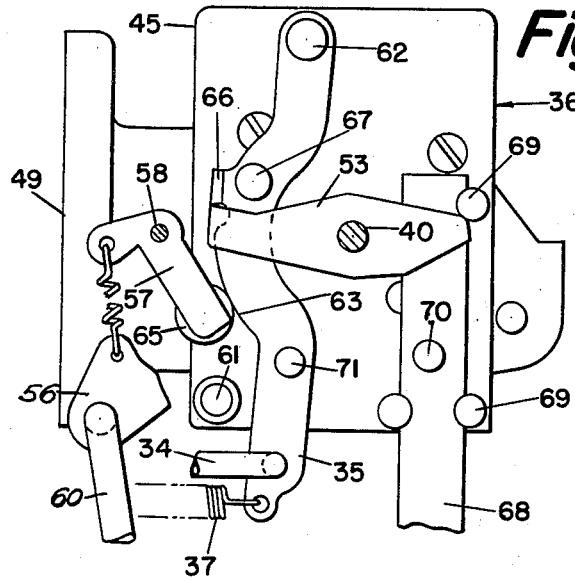
FIG. 9 is a view generally similar to FIG. 7, but showing the elements of the valve control mechanism in the partial shut-off condition.
Figure 10:
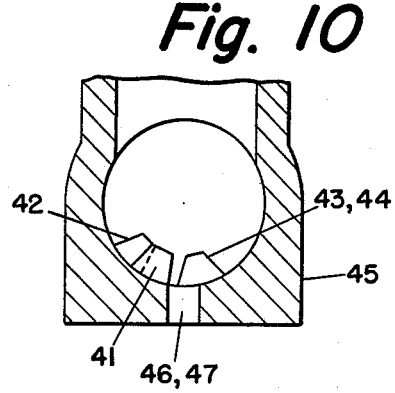
FIG. 10 is a diagrammatic view illustrating the positions of the various valve shoes in the partial shut-off condition of FIG. 9.

As ratchet 53 rotates clockwise from the FIGURE 7 position to that illustrated in FIGURE 9, valve shaft 40 (to which this ratchet is pinned) rotates clockwise to move the various valve shoes 41–44 from their FIGURE 6 positions to their FIGURE 10 positions. This clockwise rotation of the valve shaft, to the partial shut-off position, moves the proportioning shoes 41 and 42 to ineffective positions beyond the edges of their respective ports 46 and 47, and moves the two radially-aligned shut-off shoes 43 and 44 to partially closed positions, wherein they greatly restrict the flow through their respective ports 46 and 47. The last-described positions of the various valve shoes are illustrated in FIGURE 10, wherein it can be seen that the proportioning shoes 41 and 42 are ineffective to control fluid flow, and the shut-off shoes 43 and 44 have almost (but not completely) closed the respective radially-aligned ports 46 and 47. FIGURE 10 is a diagrammatic illustration somewhat similar to FIGURE 6, but showing the valve shoes all in solid lines and omitting certain structural details such as the springs, shaft, etc. Since in the partial shut-off position the shut-off shoes 43 and 44 almost (but not completely) cover the respective ports 46 and 47, the flow of both "base" and "additive" fluids is decreased or diminished. This causes the counter wheels 12, 13, 15, and 16 to slow down, which of course also causes the step-rotation of cam 27 to slow down.

It may be noted that the shape of cam surface 63 (arcuate, centered on shaft 40) is such that the camming point for roller 65, mounted on pawl 57, is the same regardless of the position of lever 56, within the latter's range of movement (e.g., 19.5°).

As dollar wheel 16 and therefore cam 27 continue to rotate at the slower rate corresponding to partial shut-off, shoe 31 falls into the second (deeper) notch or step 39, again under the urging of spring 37. This causes arm 35 to move further to the left, and lug 66 moves sufficiently to clear the left-hand end of ratchet 53. This releases ratchet 53, allowing the same to rotate further clockwise until it strikes stop 67. The operating elements have now reached the final shut-off position illustrated in FIGURE 11.

Figure 11:
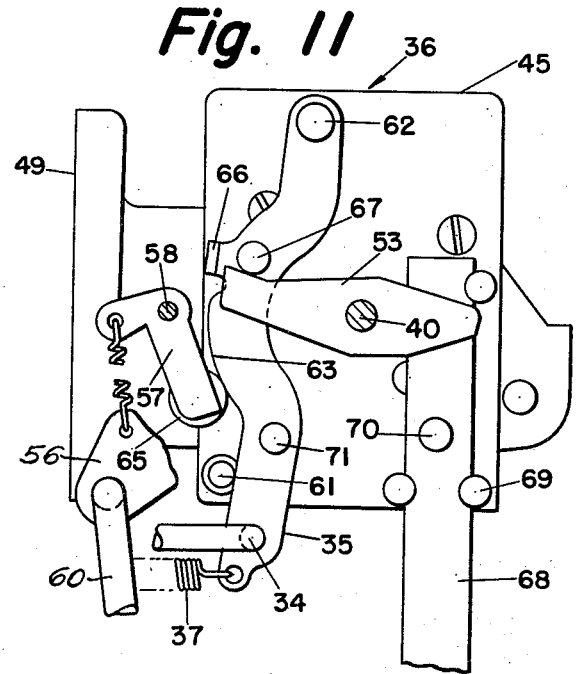
FIG. 11 is a view similar to FIG. 9, but illustrating the condition of complete shut-off.
Figure 12:
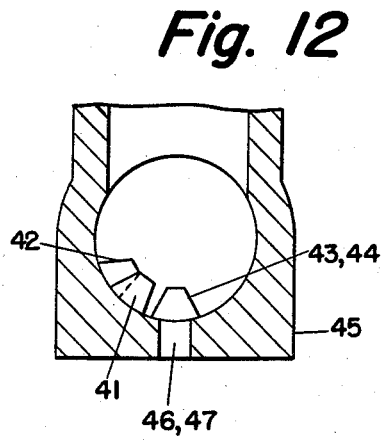
FIG. 12 is a view similar to FIG. 10, but illustrating the completely shut-off condition.

As ratchet 53 rotates further clockwise from the FIGURE 9 position to that of FIGURE 11, valve shaft 40 rotates further clockwise to move the valve shoes from their FIGURE 10 positions to their FIGURE 12 positions. In FIGURE 12, the proportioning shoes 41 and 42 are moved still further away from their respective ports 46 and 47, while the two shut-off shoes 43 and 44 are moved squarely across their respective ports 46 and 47. This completely shuts off the flow of both "base" and "additive" fluids, thus stopping the dispensing. The dispensing of the preselected number of dollars' worth of gasoline (as illustrated in FIGURES 1–3 by way of example only, six dollars' worth) is now complete.

The purpose of the reduced flow rate (as effected by the partial shut-off described in connection with FIGURES 9 and 10) is to make the final shut-off more accurate, and to make the shut-off point independent of the rate of dispensing or delivery set by the operator at the nozzle valve. In other words, the two-step shut-off described results in a very accurate fluid shut-off at the (desired) set point.

It will be noted that during the time of reduced flow (i.e., during the time of partial shut-off) the automatic proportioning control 60, 56, etc, is not effective, since during this interval pawl 57 is out of contact with ratchet 53. However, this affects only the last one-half cents' worth or less of gasoline, so the change in "blend" is insignificant. Actually, the fluid delivered at the nozzle during this extremely short time interval (of partial shut-off) will be a "blend" of approximately equal proportions of "base" and "additive" fluids.

For the next delivery or dispensing operation, the valve 36 must be reset. The means for effecting this will now be described. The pumps of the dispenser are turned off by turning the pump control handle, previously referred to, which is located on the outside of the dispenser or "pump" housing 11. Attached to this handle is a lever which operates a link 14. When the pump control handle is turned "off," link 14 is moved upward; when the pump control handle is turned "on," link 14 is moved downward.

The end of link 14 which is opposite to that coupled to the pump control handle is pivotally connected to one end of a narrow strip-like member 68 which is mounted for vertical sliding movement with respect to valve body 45, as by means of pins 69 secured to the outer face of the valve body (see FIG. 5). Toward its upper end, slide member 68 carries an outwardly-extending reset pin 70 which is arranged to engage the right-hand or tail end of ratchet 53 when the same is in the final shut-off position of FIGURE 11.

When the pump control handle is turned "off" after a dispensing operation, link 14 is moved upward, pushing slide member 68 upward. As member 68 moves upward, reset pin 70 comes into engagement with the right-hand or tail end of ratchet 53. Continued upward motion of member 68 causes pin 70 to push against the tail end of ratchet 53, rotating this ratchet counterclockwise far enough to pass by and clear the end of pawl 57. As the left-hand end of ratchet 53 passes by the end of pawl 57, this pawl can pivot slightly clockwise (about pin 58), against the bias of spring 59, to allow the left-hand end of ratchet 53 to move to a point below the end of the pawl. In FIGURE 13, which illustrates the "reset" position of the valve control mechanism, the left-hand end of ratchet 53 is illustrated as having passed by the end of pawl 57, to a position below the same.

This counterclockwise rotation of ratchet 53 rotates the valve shaft 40 in a counterclockwise direction, moving the shut-off shoes 43 and 44 away from the respective ports 46 and 47. This movement of the shut-off shoes would ordinarily tend to allow flow of fluid, but since the pump motors are now turned off (by the operation of the pump control handle), there will be no fluid delivery.

Arm 35 has mounted thereon an outwardly-extending pin 71, at a location somewhat below the lower end of cam surface 63. Pin 71 is arranged to be engaged by the left-hand end of ratchet 53, as this end swings below the end of pawl 57. As ratchet 53 continues to rotate counterclockwise under the urging of pin 70 on member 68, to and beyond the end of pawl 57, the left-hand end of this ratchet comes into contact with pin 71 and, as the ratchet continues to move counterclockwise, it forces pin 71 to the right. This is illustrated in FIGURE 13. Since pin 71 is securely fastened to arm 35, this arm and link member 34 (attached to arm 35) move to the right also, against the bias of spring 37. Bell-crank 32 then rotates clockwise (in FIGURE 3) about its pivot 33, raising the left-hand end of rocker arm 30, pivoting this rocker arm clockwise (in FIGURE 2) and moving shoe 31 away from cam 27. This lifting of the shoe free of cam 27 allows unhindered resetting of cam 27 along with wheel 16.

When the counter reset lever, located on the outside of the dispenser housing and previously referred to, is operated, all wheels of the counter or register 10 reset, as described in detail in the aforementioned Bliss patent. As dollar wheel 16 resets, it resets cam 27 through the same gear train 20, 21, 22, 23, and 26 previously described. The "reset" drive of cam 27 from dollar wheel 16 occurs in substantially the same manner as the drive during dispensing, except that now the gears rotate in opposite directions, and the cam 27 rotates in the counterclockwise or "reset" direction in FIGURE 2. The resetting operation just described causes cam 27 to be brought back to its original position (i.e., to the position it had prior to the start of dispensing).

For the next delivery or the next dispensing operation, the pump control handle is moved to the "on" position. This moves link 14, slide member 68, and pin 70 back down to the position illustrated in FIGURE 7. This movement frees pin 70 from the tail end of ratchet 53 and allows spring 54 to rotate ratchet 53 clockwise until its left-hand end again rests against the end of pawl 57. In this connection, it will be recalled that spring 54 urges shaft 40 and ratchet 53 to rotate clockwise. When this movement of ratchet 53 is completed, all the valve shoes 41–44 have been rotated by shaft 40 to their position appropriate to proportioning or "blend control," and link 60 is again operative for "blend control," that is, for control of the proportioning of the two fluids.

The clockwise rotation of ratchet 53 also frees the left-hand end of this ratchet from pin 71, allowing spring 37 to pull arm 35 and link 34 to the left. This rotates bell-crank 32 counterclockwise about its pivot in FIGURE 3, pushing the left-hand end of rocket arm 30 downwardly and rotating this latter arm counterclockwise (viewed from the FIGURE 2 direction) about its pivot 29. This moves shoe 31 back to the point where it again rests on cam 27.

The arrangement for setting cam 27 for the various numbers of dollars will now be described. Refer now to FIGURES 1 and 2. As previously stated, gear 25 is mounted for free rotation on shaft 18. The teeth of gear 25 mesh with the teeth of a gear wheel 72 which is fastened to a notched detent wheel 73, the combination of gear wheel 72 and detent wheel 73 being rotatably mounted on a stub shaft 74 which is fastened to support member 28 and extends outwardly therefrom. A detent arm 75 is pivotally mounted on a pin 76 secured to support member 28. One end of arm 75 carries a detent roller 77 which is adapted to enter into the notches of wheel 73. Roller 77 is urged into engagement with wheel 73 by means of a tension spring 78 one end of which is attached to fixed pin 29 and the other end of which is attached to that end of arm 75 opposite to roller 77. Normally, during dispensing, gear 25 is yieldably held against rotation due to its engagement with the detented gear 72; however, gear 72 may be manually rotated against the force of the detenting mechanism when desired (even during dispensing), thus rotating gear 25.

The position of the various elements shown in FIGURES 1–3 is for six dollars, and corresponds to the position of the "preselector" control handle 79 shown in FIGURE 1a. Handle 79 cooperates with a dial 80 mounted on the outside of the "pump" housing 11 and inscribed with the integers 1 through 8 (representing one dollar through eight dollars) increasing in a clockwise direction, plus another index denoted by the legend "fill." For convenience, these indicia have been parenthetically applied to the appropriate notches of detent wheel 73 in FIGURE 1, it being pointed out that this wheel is coupled to handle 79 and rotates in synchronism therewith. Handle 79 is connected to a coupling 81, which is connected in turn through a rigid link shaft 82 to the coupling portion of detent wheel 73. Therefore, if handle 79 is turned clockwise from the position illustrated in FIGURE 1a to point to the "7," detent wheel 73 rotates clockwise to the next detent position or notch. This also rotates gear 72 clockwise and gear 25, meshing therewith, counterclockwise. Since gear 23 is carried on stud 24 which is fastened to gear 25, gear 23 is rolled counterclockwise (i.e., it is orbited, as a planet gear) around sun gear 22, which is now stationary (assuming dispensing is not then in progress). This rolling motion of gear 23 rotates gear 26, and therefore cam 27, counterclockwise one-tenth turn (in the direction indicated by the legend "set higher" in FIGURE 2) from the position illustrated in FIGURES 1–3. From this new position, when the dispenser is running, the automatic shut-off as previously described will occur at seven dollars. A higher setting of handle 79 (to eight dollars) moves cam 27 around counterclockwise a further one-tenth turn step, to shut-off at the designated number (eight) of dollars.

If handle 79 is turned counterclockwise to point to the "5," detent wheel 73 rotates counterclockwise to the adjacent notch. This rotates gear 72 counterclockwise and gear 25, clockwise. Gear 23 is then rolled clockwise around sun gear 22. This rolling motion of gear 23 rotates gear 26 and cam 27 clockwise (in the "set lower" direction) one-tenth turn from the FIGURE 2 position. From this new position, the automatic shut-off will occur at five dollars. Lower settings of handle 79 (from four dollars down to one dollar) move cam 27 around clockwise in steps of one-tenth turn for each dollar, to shut off at the designated number of dollars.

It is desired to be pointed out that the handle 79 can be freely rotated, at any time during dispensing, to any number of dollars (up to and including eight) which is in excess of the number of dollars indicated at that same time on the cost wheels of the register. In this case, the gear arrangement 22, 23, 25, 26 will operate as a differential, to effect the correct positioning of cam 27, and this even though gear 22 is step-rotating at the same instant that handle 79 is rotated to rotate gear 25. Of course, if it be attempted to rotate handle 79, during dispensing, to a number of dollars less than that indicated on the cost wheels, fluid shut-off will immediately occur, since in this case cam 27 will be rotated in the "set lower" direction (which is the same as the "run" direction) to position the notches 38 and 39 under shoes 31, causing shut-off in the manner above described.

A portion of gear 25 lies in the same vertical plane as rocker arm 30 (see FIGURE 1). Said portion of gear 25 is provided with an integral arcuate skirt or shroud 83 which has an outer radius somewhat greater than the maximum radius of cam 27, so that said skirt extends outwardly (in a radial direction) beyond the outer periphery of this cam. The ends of shroud 83 subtend an angle of about 138° at the center of shaft 18. One end 83a of shroud 83 takes an approximately radial direction, while the other end 83b of this shroud takes a direction lying at a small angle to a radial direction. More exactly, looking at gear 25 in the direction of FIGURE 2, if gear 25 is rotated until the radial line joining the center of shaft 18 and the center of pin 24 is vertical, then end 83a of the shroud takes a horizontal direction and end 83b takes a vertical direction.

The ends 83a and 83b of shroud 83 are adapted to cooperate with a rigid pin 84 which is secured to supporting member 28 and extends outwardly therefrom a distance such that its outer end is approximately in the same plane as the outer face of shroud 83. One function of shroud 83 is to limit rotation of gear 25 (and therefore also of gear 72 and detent wheel 73) to less than 360°. Also, the manual rotation of cam 27 (by means of handle 79) is limited by the action of shroud 83 to less than 360°, thus preventing any circumferential or angular mispositioning of cam 27 which would result due to the applicable gear ratios, if gears 72 and 25 were rotatable through 360°. Thus, starting from the position illustrated in FIGURES 1, 1a, and 2, if handle 79 (and detent wheel 73) are rotated clockwise to the "8," gear 72 rotates clockwise and gear 25, counterclockwise. This counterclockwise rotation of gear 25 is such that, at "8," shroud end 83a is positioned immediately clockwise of pin 84. Now, if it is attempted to rotate handle 79 clockwise beyond "8" (which would tend to rotate gear 25 further counterclockwise), shroud end 83a engages or contacts the fixed pin 84, thus positively preventing any further rotation of gear 25 in the counterclockwise direction, and of handle 79 in the clockwise direction. At the same time, of course, further rotation of cam 27 in the "set higher" direction is prevented.

Starting from the position illustrated in FIGURES 1, 1a, and 2, if handle 79 (and detent wheel 73) are rotated counterclockwise to "fill" (which position is located below "1"), gear 72 rotates counterclockwise and gear 25 clockwise. This clockwise rotation of gear 25 is such that, at "fill," shroud end 83b is positioned immediately counterclockwise of pin 84. This is illustrated in FIGURE 14, which is a view somewhat similar to FIGURE 2 but illustrating the position of the various parts for the "fill" setting of the preselecting mechanism. Now, if it is attempted to rotate handle 79 counterclockwise beyond "fill" (which would tend to rotate gear 25 further clockwise), shroud end 83b engages fixed pin 84, thus positively preventing any further rotation of gear 25 in the clockwise direction, and of handle 79 in the counterclockwise direction. At the same time, of course, further rotation of cam 27 in the "set lower" direction is prevented.

In the "fill" position of the preselecting mechanism, illustrated in FIGURE 14, shroud 83 has another function, which will now be described. Note that the shoe end of arm 30 is positioned counterclockwise with respect to pin 84. As previously described, the shroud 83 is in the same vertical plane as rocker arm 30, and this shroud extends radially beyond the outer periphery of cam 27. Setting of the mechanism for price is ordinarily done with the pump turned off, in which condition shoe 31 is held away from cam 27 (as previously described). When the pump control handle is moved to "on," shoe 31 is moved back toward cam 27, as previously described. Now, however (assuming that the mechanism has been set to "fill"), the outer periphery of shroud 83 catches shoe 31 as the latter moves inward toward cam 27, and prevents shoe 31 from coming into engagement with cam 27. In other words, shroud 83 now keeps shoe 31 clear of cam 27, as long as the preselecting mechanism is in the "fill" position. See FIGURE 14. Thus, in the "fill"

position, arm 30 is held in an inoperative position with respect to the actuating member or cam 27, and the preselecting mechanism of the invention is in effect disabled or rendered inoperative; in this position, cam 27 can make any number of rotations without actuating the automatic shut-off mechanism described hereinabove.

For "manual" operation of the "pump" (e.g., in cases where the customer orders a certain number of gallons of gasoline), the preselecting mechanism is set to the "fill" position, and fluid shut-off is then under only the manual control of the operator, by means of the nozzle valve.

An automatic shut-off nozzle is required on the hose of the dispenser of this invention, to automatically shut off the fluid when the preselecting mechanism is set on "fill," and to automatically shut off in those cases where the customer orders more motor fuel (gasoline) than his tank will hold.

The invention claimed is:

1. A fluid dispensing apparatus comprising a rotatable actuating member providing a single camming surface with two successive operating steps immediately adjacent to each other; means for automatically rotating said member through an angle proportional to the quantity of fluid dispensed, a cam follower continuously bearing against said camming surface to engage in an uninterrupted sequence, during the rotation of said member, the first of said steps and then the second of said steps, a valve the position of which controls the dispensing of fluid, and a mechanical linkage directly coupling the stem of said valve to said cam follower for mechanical actuation of the former by the latter, the valve stem being actuated to reduce the flow rate of the fluid being dispensed in response to the engagement by said follower of the first of said steps and being actuated to stop the dispensing of fluid in response to the engagement by said follower of the second of said steps.

2. Apparatus for the simultaneous dispensing of two fluids comprising valves individually controlling the dispensing of said fluids, a rotatable actuating member providing a single camming surface with two successive operating steps immediately adjacent to each other; means for automatically rotating said member through an angle proportional to the total quantity of fluids dispensed, a cam follower continuously bearing against said camming surface to engage in an uninterrupted sequence, during the rotation of said member, the first of said steps and then the second of said steps, and a common mechanical linkage directly coupling both of said valves to said cam follower for mechanical actuation of the former by the latter, both of said valves being actuated to reduce the total flow rate of the fluids being dispensed in response to the engagement by said follower of the first of said steps and both valves being actuated to stop the dispensing of fluids in response to the engagement by said follower of the second of said steps.

3. Apparatus in accordance with claim 2, wherein each of said valves includes a respective shut-off shoe, both shoes being actuated by said linkage, in response to the engagement by said follower of the first of said steps, to a partially closed position, and thereafter being actuated by said linkage, in response to the engagement by said follower of the second of said steps, to a fully closed position.

4. Apparatus in accordance with claim 2, wherein each of said valves includes a respective proportioning shoe, said shoes being actuated in respective opposite directions by a portion of said linkage, to vary the relative proportions of the two fluids dispensed.

5. Apparatus in accordance with claim 2, wherein each of said valves includes a respective proportioning shoe, said shoes being actuated in respective opposite directions by a portion of said linkage, to vary the relative proportions of the two fluids dispensed; and wherein each of said valves includes also a respective shut-off shoe, both of the last-mentioned shoes being actuated by said linkage, in response to the engagement by said follower of the first of said steps, to a partially closed position, and thereafter being actuated by said linkage, in response to the engagement by said follower of the second of said steps, to a fully closed position.

6. Apparatus for the simultaneous dispensing of two fluids comprising valves individually controlling the dispensing of said fluids, each of said valves including a respective proportioning shoe and each valve including also a respective shut-off shoe; a rotatable actuating member, means for automatically and continuously rotating said member, during dispensing, through an angle proportional to the total quantity of fluids dispensed, and a common mechanical linkage between said member and both of said valves, for actuating both of said shut-off shoes to shut-off position to stop the dispensing of both fluids at a predetermined angular position of said member; said proportioning shoes being adapted to be actuated in respective opposite directions, during dispensing, by a portion of said linkage, to thereby vary the relative proportions of the two fluids dispensed.

References Cited in the file of this patent

UNITED STATES PATENTS

| 1,957,090 | Berkeley | May 1, 1934 |
| 2,593,894 | Klopfenstein | Apr. 22, 1952 |
| 2,605,930 | McNeil | Aug. 5, 1952 |
| 2,880,908 | Young | Apr. 7, 1954 |